United States Patent
Venkatesan et al.

(10) Patent No.: US 11,808,034 B2
(45) Date of Patent: Nov. 7, 2023

(54) FLOATING CONNECTION FASTENING SYSTEM

(71) Applicant: OMG, Inc., Agawam, MA (US)

(72) Inventors: Arun Srinivasan Venkatesan, Feeding Hills, MA (US); Timothy F. Gillis, Florence, MA (US); Frederick A. Enko, Westfield, MA (US); Mark A. Dicaire, Boylston, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 16/519,388

(22) Filed: Jul. 23, 2019

(65) Prior Publication Data
US 2020/0284033 A1 Sep. 10, 2020

Related U.S. Application Data

(60) Provisional application No. 62/815,546, filed on Mar. 8, 2019.

(51) Int. Cl.
| | |
|---|---|
| *F16B 33/00* | (2006.01) |
| *E04B 2/82* | (2006.01) |
| *F16B 25/00* | (2006.01) |
| *F16B 5/02* | (2006.01) |

(52) U.S. Cl.
CPC .............. *E04B 2/82* (2013.01); *F16B 5/0275* (2013.01); *F16B 25/0063* (2013.01)

(58) Field of Classification Search
CPC .... E04B 2/82; E04B 2001/2652; E04B 2/825; F16B 5/0275; F16B 5/0283
USPC ....... 411/533, 546, 528, 378, 20, 21, 25, 42, 411/60.2; 52/285.2, 506.5
See application file for complete search history.

(56) References Cited

U.S. PATENT DOCUMENTS

| | | | | |
|---|---|---|---|---|
| 1,099,668 A | * | 6/1914 | Rosenberg | F16B 13/124 411/42 |
| 1,119,843 A | * | 12/1914 | Law | F16B 13/066 411/25 |
| 3,869,216 A | * | 3/1975 | Cseke | A47L 17/00 401/43 |
| 3,881,293 A | | 5/1975 | Conville | |
| 4,862,556 A | * | 9/1989 | Grass | E05D 5/0276 16/382 |
| 4,902,179 A | * | 2/1990 | Harker | F16B 13/002 411/21 |

(Continued)

FOREIGN PATENT DOCUMENTS

EP      2 868 855      * 5/2015

*Primary Examiner* — Gary W Estremsky
(74) *Attorney, Agent, or Firm* — Alix, Yale & Ristas, LLP

(57) ABSTRACT

A floating connection fastening system employs a semi-flexible floating bushing having a sleeve that may have an axial slot which captures a fastener having a head, an unthreaded shank portion and a threaded portion. The sleeve may have an outer primary surface and a plurality of protuberances that project outward from the outer primary surface. An offset cap mounts to the bushing/fastener assembly and receives a driver bit. The offset cap defines an offset clearance for installation of the fastener and bushing. The floating connection is installed by driving the fastener through a non-load bearing member so as to form a bore and threadably engage a load bearing member. The floating bushing has a flange which engages the surface of the non-load bearing member, and the sleeve is entirely received in the formed bore.

29 Claims, 11 Drawing Sheets

(56) References Cited

U.S. PATENT DOCUMENTS

| | | | | |
|---|---|---|---|---|
| 5,906,080 | A * | 5/1999 | diGirolamo | E04B 2/766 52/243.1 |
| 5,997,229 | A | 12/1999 | Akers | |
| 6,196,778 | B1 * | 3/2001 | Wakai | F16B 13/124 411/60.2 |
| 6,360,842 | B1 * | 3/2002 | Combest | H04R 1/026 181/150 |
| 6,582,171 | B2 * | 6/2003 | Bondarowicz | F16B 21/18 411/525 |
| 6,595,733 | B1 | 7/2003 | Willert | |
| 6,623,492 | B1 | 9/2003 | Berube et al. | |
| 7,828,502 | B2 * | 11/2010 | Chretien | F16B 43/00 411/125 |
| 8,210,784 | B2 * | 7/2012 | Hartmann | F16B 41/002 411/383 |
| 8,262,330 | B2 | 9/2012 | Ishino et al. | |
| 8,458,972 | B1 * | 6/2013 | Stodola | E04B 2/825 52/284 |
| 8,828,067 | B2 | 9/2014 | Tipirneni et al. | |
| 9,017,329 | B2 | 4/2015 | Tyber et al. | |
| 9,360,032 | B2 * | 6/2016 | Dicaire | F16B 5/02 |
| 10,228,012 | B2 * | 3/2019 | Holt | F16B 5/02 |
| 2003/0077118 | A1 * | 4/2003 | Kobusch | F16B 5/0283 403/408.1 |
| 2005/0008449 | A1 * | 1/2005 | Horita | F16B 5/0283 411/383 |
| 2007/0122253 | A1 | 5/2007 | Murtha | |
| 2008/0226420 | A1 * | 9/2008 | Huang | F16B 5/0283 411/352 |
| 2011/0229285 | A1 * | 9/2011 | Fluckiger | F16B 5/0283 411/383 |
| 2012/0017529 | A1 * | 1/2012 | Shadwell | F16B 41/002 411/21 |
| 2018/0100532 | A1 * | 4/2018 | Mugan | F16B 21/086 |

* cited by examiner

Fig. 5
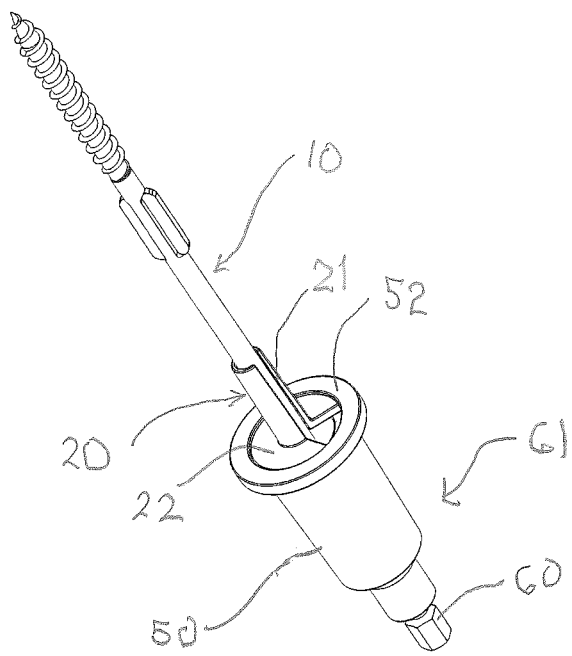
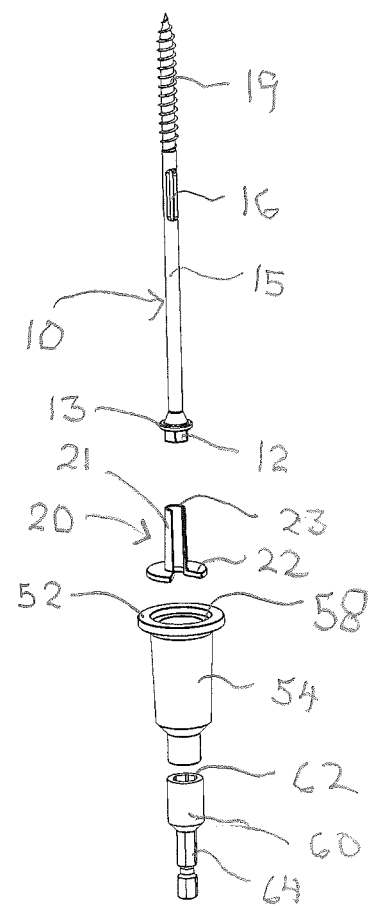
Fig. 6

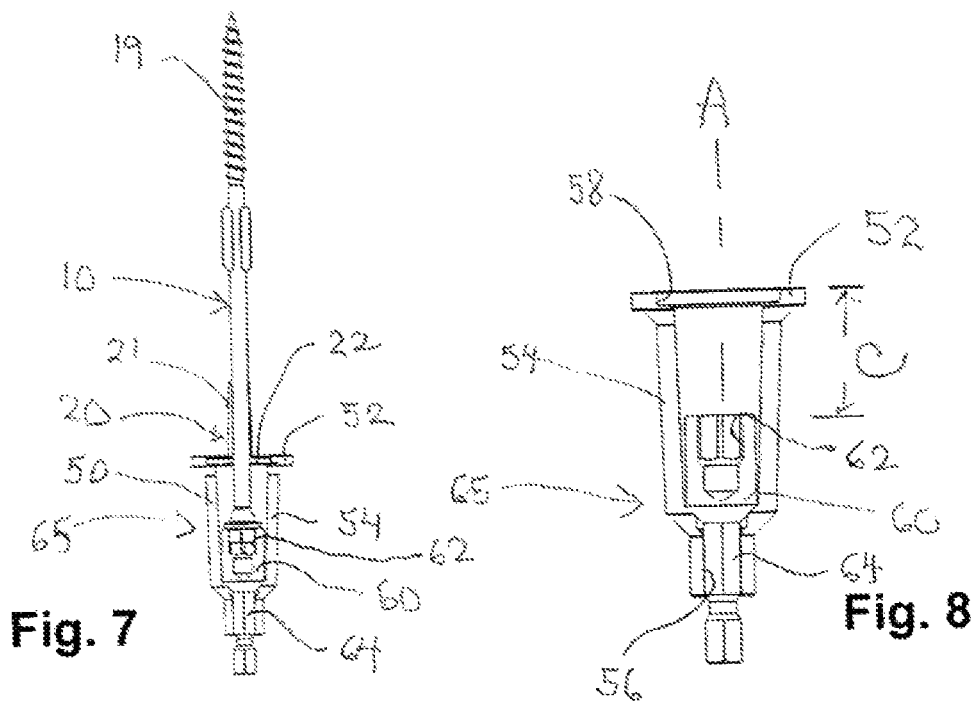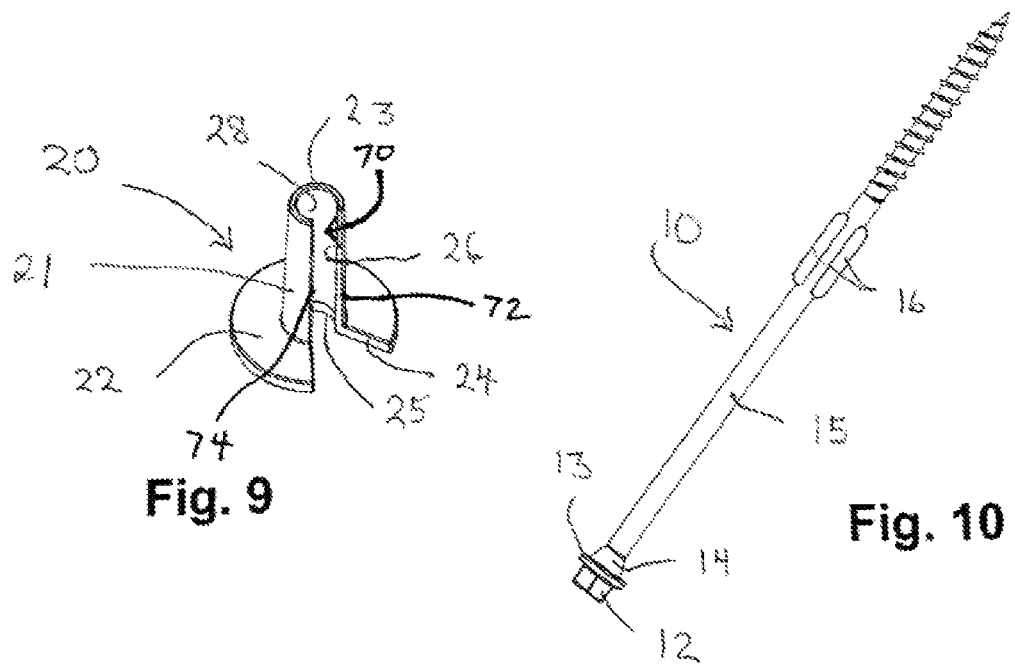

FLOATING CONNECTION FASTENING SYSTEM

CROSS-REFERENCE TO RELATED APPLICATION

This application claims the priority of U.S. Provisional Patent Application No. 62/815,546 filed on Mar. 8, 2019.

BACKGROUND

This disclosure relates generally to devices and techniques for implementing a floating connection. More particularly, this disclosure relates to fastening systems which employ a floating connection to secure a non-load bearing wall to a truss or load bearing structure.

In some construction techniques, interior non-load bearing walls are typically framed approximately 1½ inch to ¾ inch below the load bearing components, such as, for example, floor joists, floor trusses, roof trusses, etc. The gap allows the load bearing components to deflect under pre-designed loads. The non-load bearing wall still requires bracing against lateral movement which is the principal objective of fastening between the non-load bearing wall and the truss or load bearing structures.

It is a well-known characteristic that if the non-load bearing walls are built flush to the underside of the load bearing components, the walls potentially become load bearing or quasi-load bearing. Such characteristics result in the transfer of load to structural components which, over time, typically result in dips in floors, cracking of finished work and failure of various components.

It is also possible that the load bearing structure may deflect upwardly relative to a partition wall. In the latter instance, the wall may be displaced upwardly or otherwise displaced. Consequently, for many installations, it is desired to implement a floating connection between a non-load bearing wall and a load bearing member by both creating a gap between the top of the non-load bearing wall and the underside of the load bearing member and/or creating a gap at the underside of the wall top plate between the head or flange of the fastener and the underside of the top plate so that, upon driving, the fastener sits proud relative to the bottom of the top plate.

As used herein, the phrase "floating connection" refers to a connection which accommodates relative vertical movement between connected structures, but limits movement in the lateral and transverse direction.

One technique for implementing a floating connection between a generally vertical non-load bearing wall and a generally horizontal load bearing wall involves usage of a specially configured fastener. One such representative fastener has a head with a flange-like tapered underside and a shank which has a non-threaded axially extended portion adjacent the flange. The unthreaded portion has a slip surface or Teflon™-like coating to facilitate sliding along the unthreaded portion. The fastener has an intermediate knurl and a threaded portion at the distal end. The head and flange have a diameter which is greater than the unthreaded portion. Upon driving the fastener in the top plate assembly of the non-load bearing interior wall, the knurl forms a bore which is equal to or slightly greater than the diameter of the unthreaded portion of the fastener. The fastener is driven into the truss or support member so that the thread engages into the support member and the head only engages against the underside of the top plate or projects below the underside of the top plate to form a slight gap which is typically on the order of ½ to ¾ inches. The unthreaded portion of the fastener thus slides in the bore relative to the non-load bearing member.

U.S. Pat. No. 9,360,032 discloses a fastener assembly specifically configured to connect a non-load bearing wall to a truss. The fastener assembly comprises a fastener which has a head and an axially extending shank which has an unthreaded shank portion and a threaded shank portion adjacent the distal end. A sleeve is retained on the fastener and disposed about the unthreaded shank portion. The sleeve is axially displaceable or slidable along the unthreaded shank portion. The sleeve is typically a plastic member with one end engageable against the upper end of the threaded portion and the other end engageable against a flange or a tapered neck disposed adjacent the head.

The unthreaded shank portion extends an axial length which is greater than the longitudinal length of the sleeve. The disclosed fastener assembly of U.S. Pat. No. 9,360,032 is employed for implementing a floating connection between a non-load bearing wall and a load bearing component.

It should be appreciated that the floating connection for all installations is replicated numerous times to complete the installation.

The present disclosure involves a fastening system for efficiently implementing a floating connection between a non-load bearing member and a load bearing member to provide a reliable and durable floating connection.

SUMMARY

In one embodiment, a connecting system for installing a floating connection in a building assembly comprises a bushing and a fastener. The bushing includes a sleeve defining a first axis and has a locating flange extending radially outward from the sleeve. The fastener has a head and a shank, and the shank has an unthreaded proximal portion extending from the head and a threaded terminal portion. The sleeve is aligned on the unthreaded proximal section of the fastener shank and rotationally independent thereto, and the sleeve has an outer primary surface and a plurality of protuberances that project outward from the outer primary surface.

In another embodiment, a method for installing a floating connection comprises a step of engaging an adaptor with a driver bit. The adapter has a reference flange defining an offset clearance. An elongate fastener is captured with a bushing having a sleeve defining an axial slot and having a locating flange extending radially outward. The axial slot allows flexation of the sleeve. The fastener having a threaded distal section toward a tip and an unthreaded proximal section toward a head. The sleeve is aligned on the unthreaded proximal section with the axial slot overlapping the unthreaded proximal section. The fastener is engaged with the driver bit, which causes the locating flange to abut a portion of the reference flange in a rotationally independent relationship. The fastener is driven through a non-load bearing member and threadably engages a load bearing member so that at least a portion of the sleeve is received in a bore in the non-load bearing member.

In yet another embodiment, a connecting system for installing a floating connection in a building assembly comprises a bushing and a fastener. The bushing comprises a sleeve defining a first axis and extending from a first end to a second end defining a terminal edge defining an inner diameter. The bushing also has a locating flange disposed proximate the first end of the sleeve. The fastener has a head, and a shank with an unthreaded proximal portion extending from said head and a threaded terminal portion. The inner diameter defined by the terminal edge of the sleeve is interrupted by an axially extending slot into the sleeve, and the sleeve is aligned on the unthreaded proximal section with the axial slot overlapping the unthreaded proximal section. The fastener is captured by the bushing with the bushing between the head and the threaded terminal portion such that the sleeve is rotatably and axially slidable relative to the fastener along said unthreaded portion. The sleeve has an outer primary surface and a plurality of protuberances that project outward from the outer primary surface.

BRIEF DESCRIPTION OF THE DRAWINGS

FIG. 5 is a third perspective view of the floating connection assembly of FIG. 1;

FIG. 6 is an exploded perspective view of the floating connection assembly of FIG. 5;

FIG. 7 is a central sectional view of the floating connection assembly of FIG. 1, FIG. 8 is an enlarged sectional view of the driver attachment assembly of FIG. 7;

FIG. 9 is an enlarged perspective view of the floating bushing of FIG. 7;

FIG. 10 is an enlarged perspective view of the fastener of FIG. 7;

DETAILED DESCRIPTION

Figure 1:
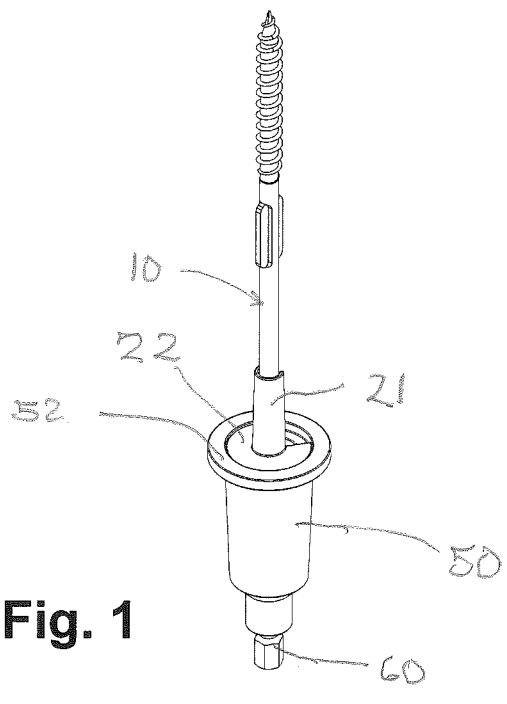
FIG. 1 is a perspective view of a floating connection assembly comprising a fastener, a floating bushing and a driver attachment assembly in engaged relationship.
Figure 2:
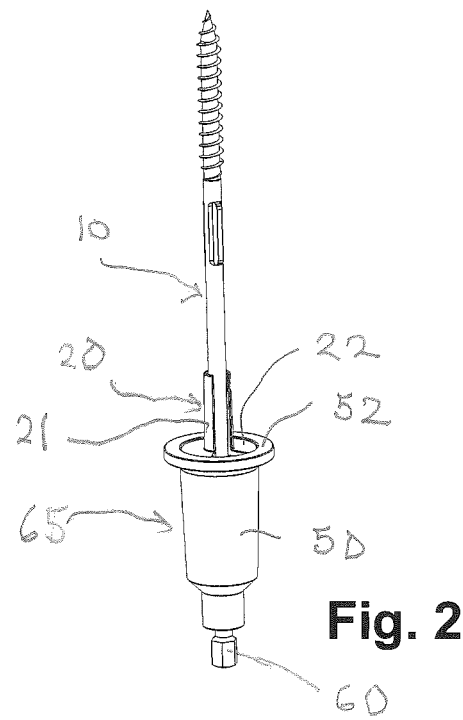
FIG. 2 is a second perspective view of the floating connection assembly of FIG. 1.
Figure 3:
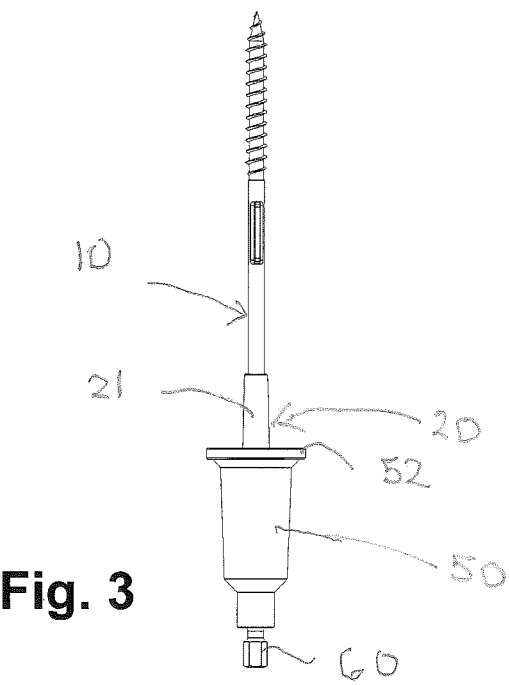
FIG. 3 is an elevational view of the floating connection assembly of FIG. 1.
Figure 4:
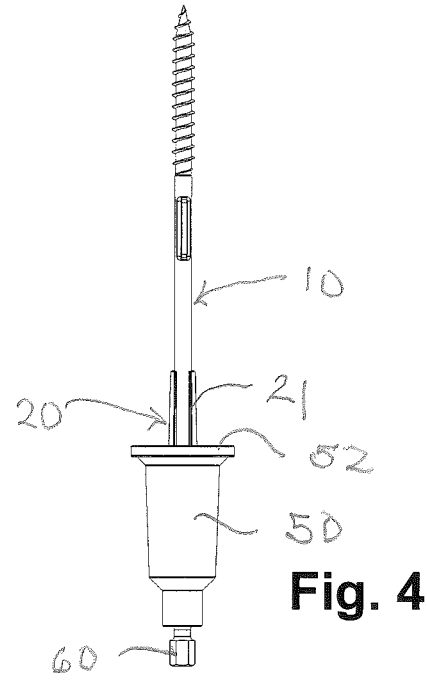
FIG. 4 is an opposite elevational view of the floating connection assembly of FIG. 3.

With reference to the drawings wherein like numerals represent like parts throughout the several figures, a floating connection fastening system employs a fastener 10, a floating bushing 20 (FIG. 9) or 30 (FIG. 19) mounted to or capturing the fastener, and a driver offset adaptor 50 which mounts a driver bit 60 and receives the fastener/sleeve assembly. A driver 70 (FIG. 11) has a chuck which engages the driver bit and rotatably drives the fastener. The principal innovative components are the floating bushings 20, 30 and the cooperating adaptor 50. As described herein, "upper" and "lower" refer to preferred installation orientations for descriptive purposes and should not be deemed limiting.

With additional reference to FIGS. 6 and 10, the connection system is described in terms of a representative preferred fastener 10 configured to form a bore and to connect a non-load bearing member to a load bearing member. The fastener 10 preferably has a six inch axial length which includes a hex head 12 and an integral retaining washer or a flange 13 adjacent a tapered frustro-conical neck 14. Other head, retainer flange/neck configurations are possible. An unthreaded cylindrical shank portion 15 axially extends approximately 4 inches from the neck 14. A threaded portion 18 extends to a threaded distal tip 19. The fastener preferably has an intermediate reamer 16 having diametrically protruding bore forming blades. In a preferred embodiment, the maximum diameter of the head 12 and the unthreaded portion 15 are 0.26 inches and 0.020 inches, respectively. The major diameters of the reamer 16 and threaded portion 18 are 0.24 inches and 0.26 inches, respectively. Naturally, other fastener configurations which have an unthreaded shank portion and have different dimensions are possible.

A slidable bushing 20 or 30 is configured to mount onto and surround the unthreaded shank portion 15 of the fastener to thereby capture the fastener prior to installation. The bushing 20 or 30 essentially functions to axially slide relative to the unthreaded shank portion 15 which, post installation, may axially move. Each bushing 20, 30 is preferably formed from plastic and has a semi-flexible sleeve 21, 31 which extends approximately ⅞ to one inch with an outer diameter less than the outside diameter of the head flange 13. Each sleeve 21, 31 in a normal non-flexed condition has an inner diameter greater than the diameter of the unthreaded portion 15 and less than the maximum diameters of the flange 13 and reamer 16. The bushing 20 or 30 axially retains the fastener by the opposed sleeve ends 23, 25 or 33, 35, respectively engaging the reamer 16 and the flange 13 and/or the neck 14.

Figure 11:
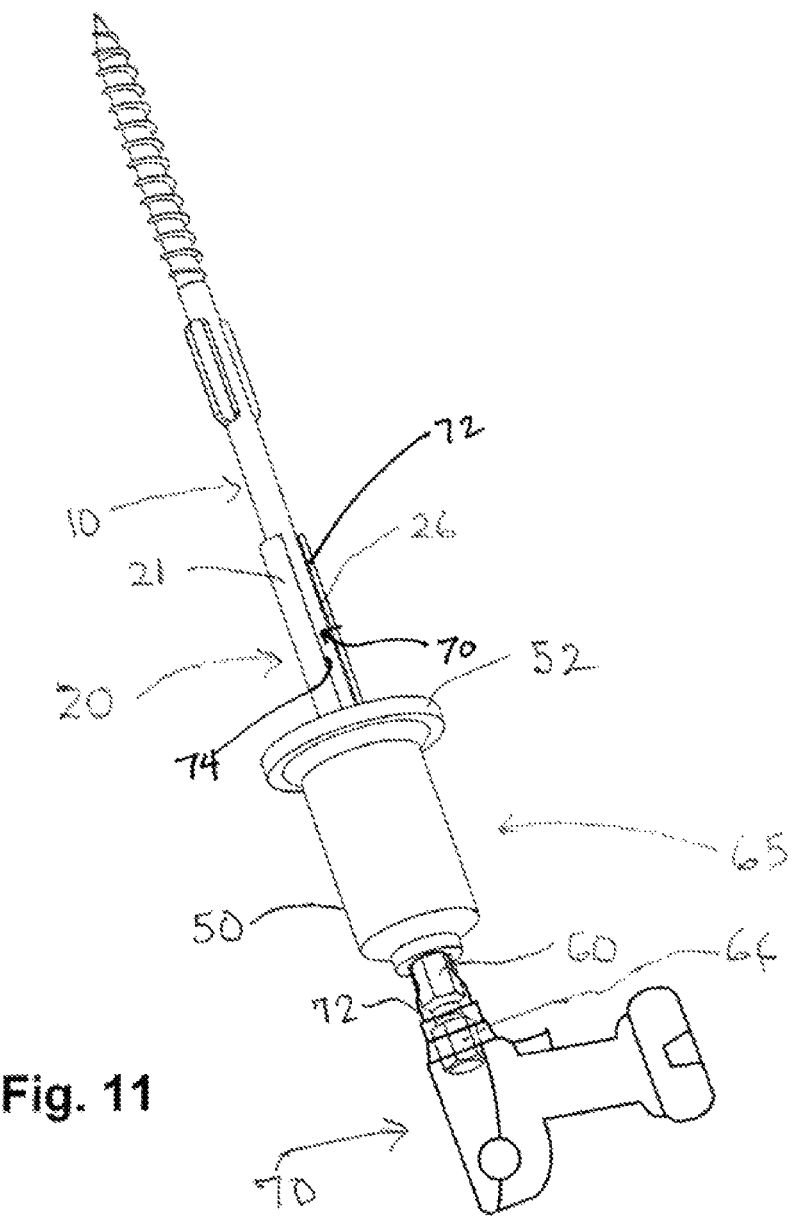
FIG. 11 is a perspective view, partly broken away and partly representational, of a driver, an attachment assembly, a fastener and a floating bushing in assembled driving relationship.
Figure 12:
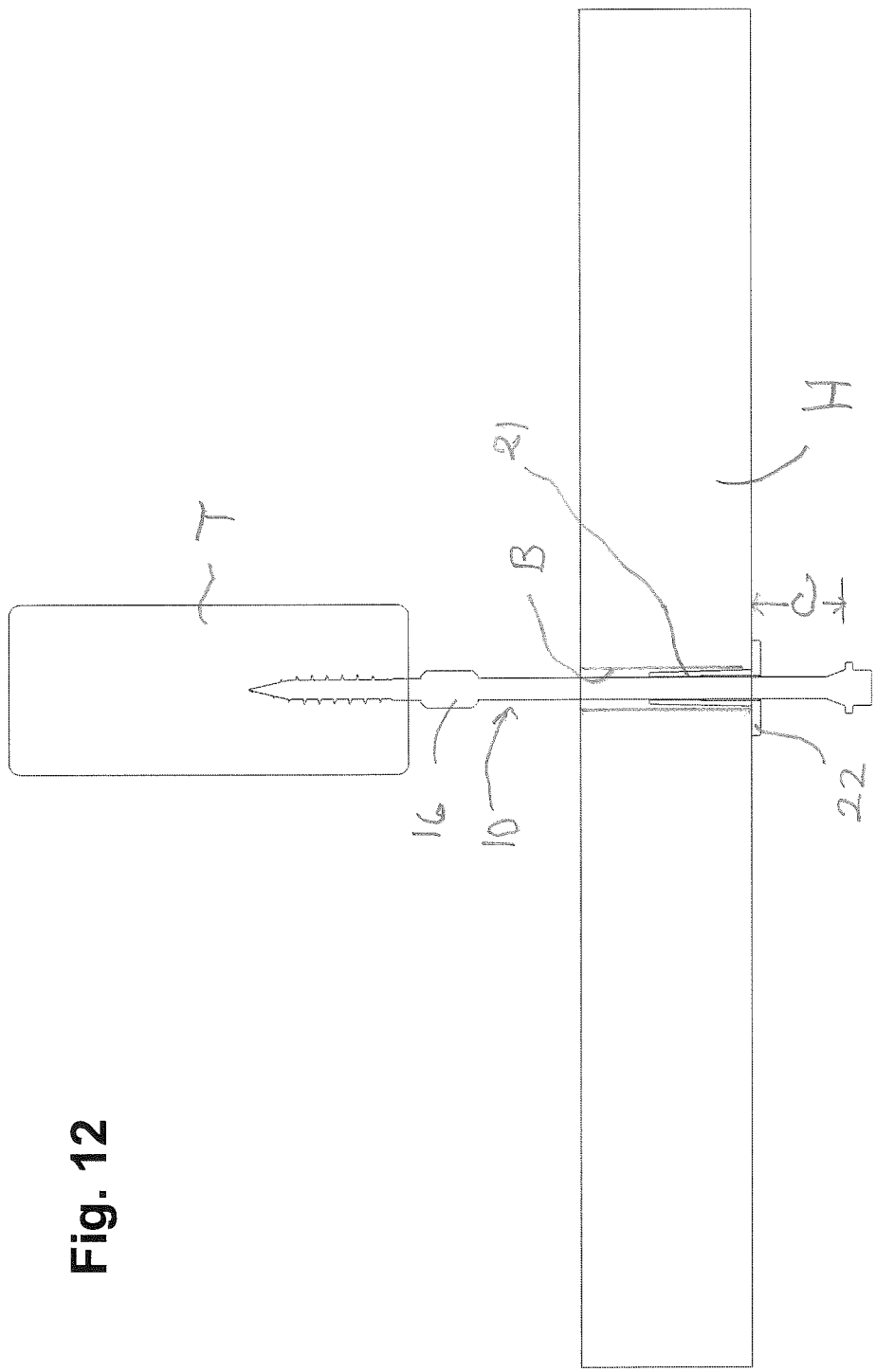
FIG. 12 is a representational sectional view of an installed floating connection.
Figure 13:
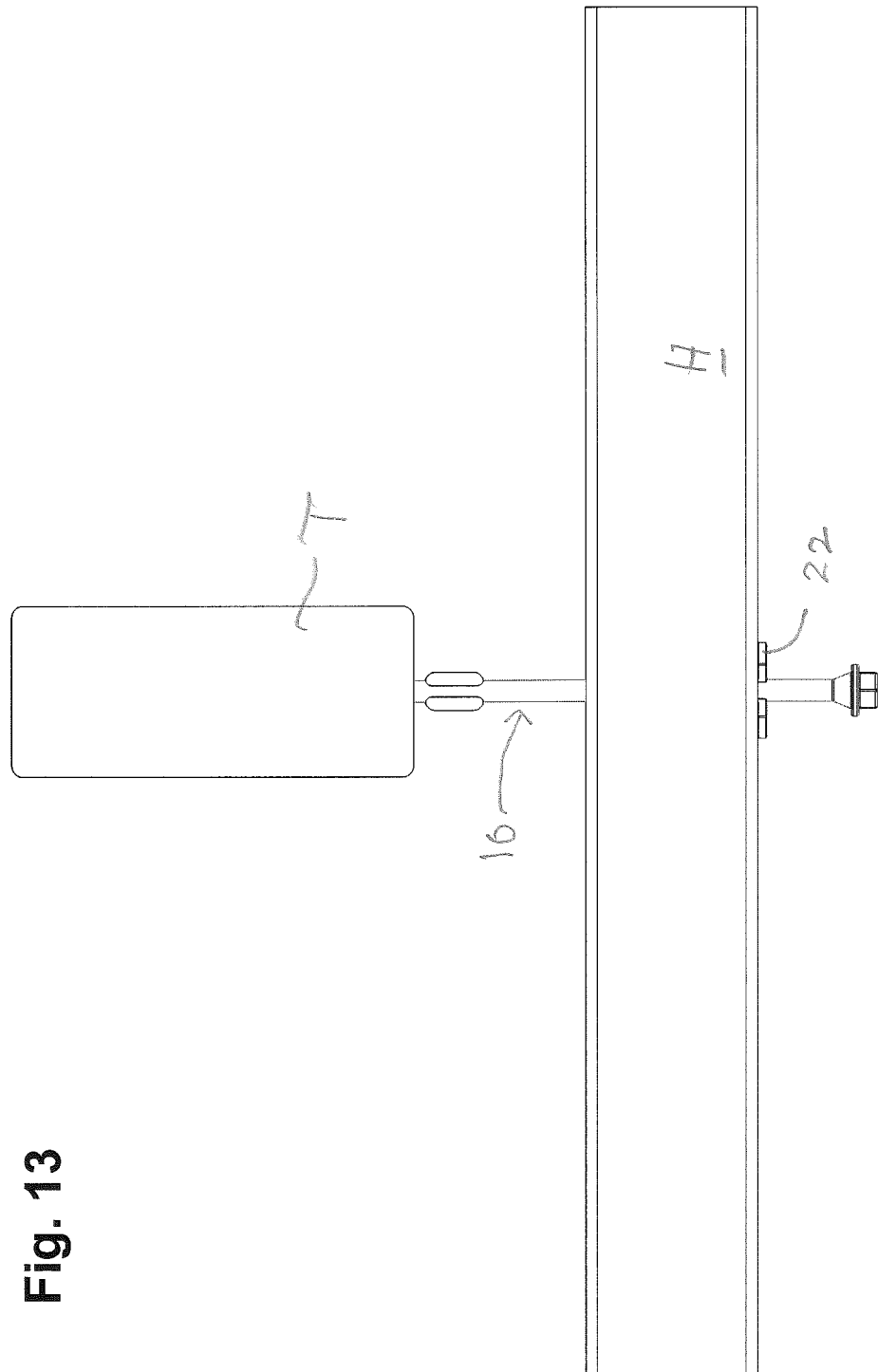
FIG. 13 is a representational elevational view of the installed floating connection of FIG. 12.
Figure 14:
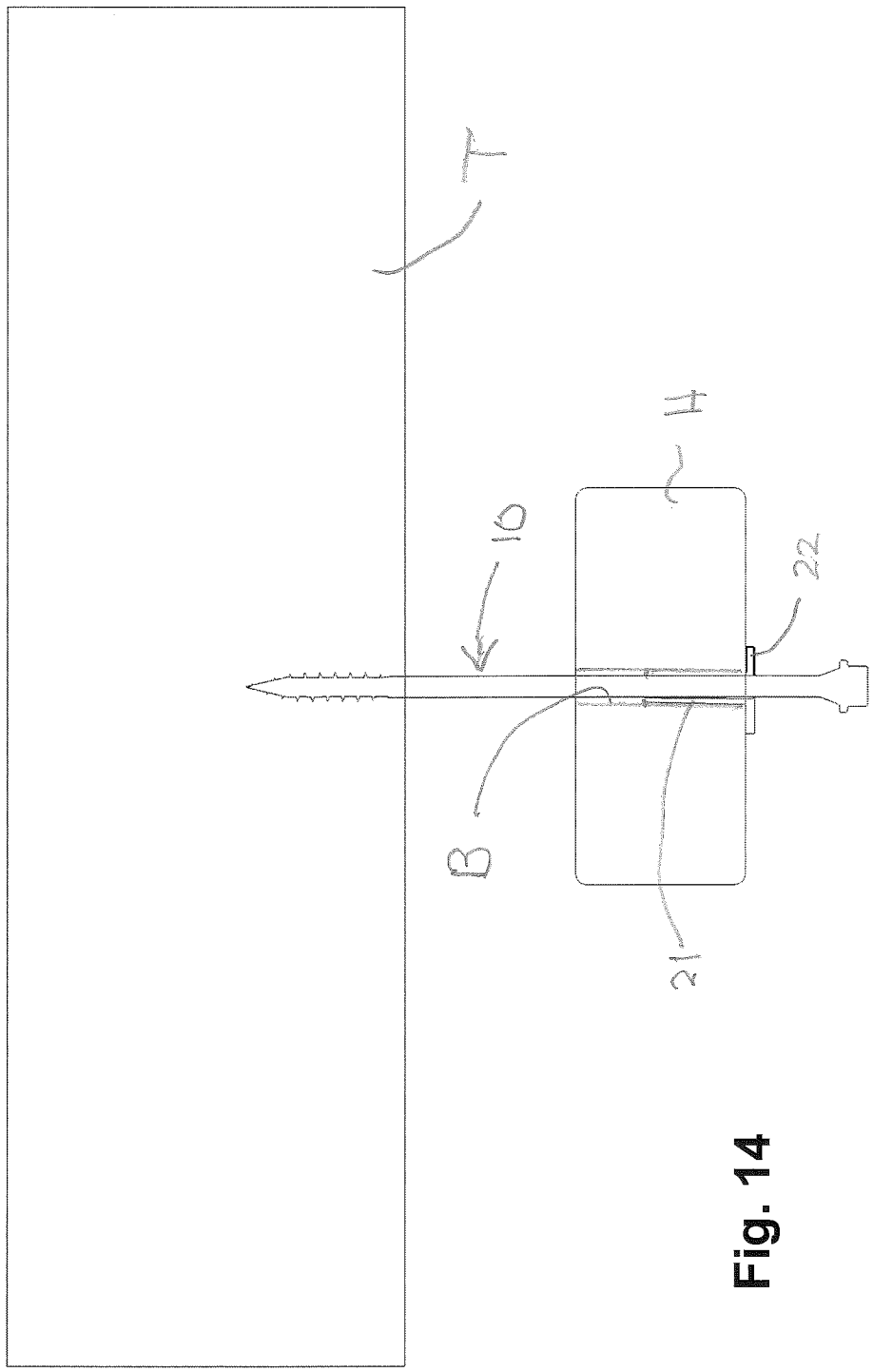
FIG. 14 is a representational sectional view of the installed floating connection of FIG. 12 from a 90° perspective thereof.
Figure 15:
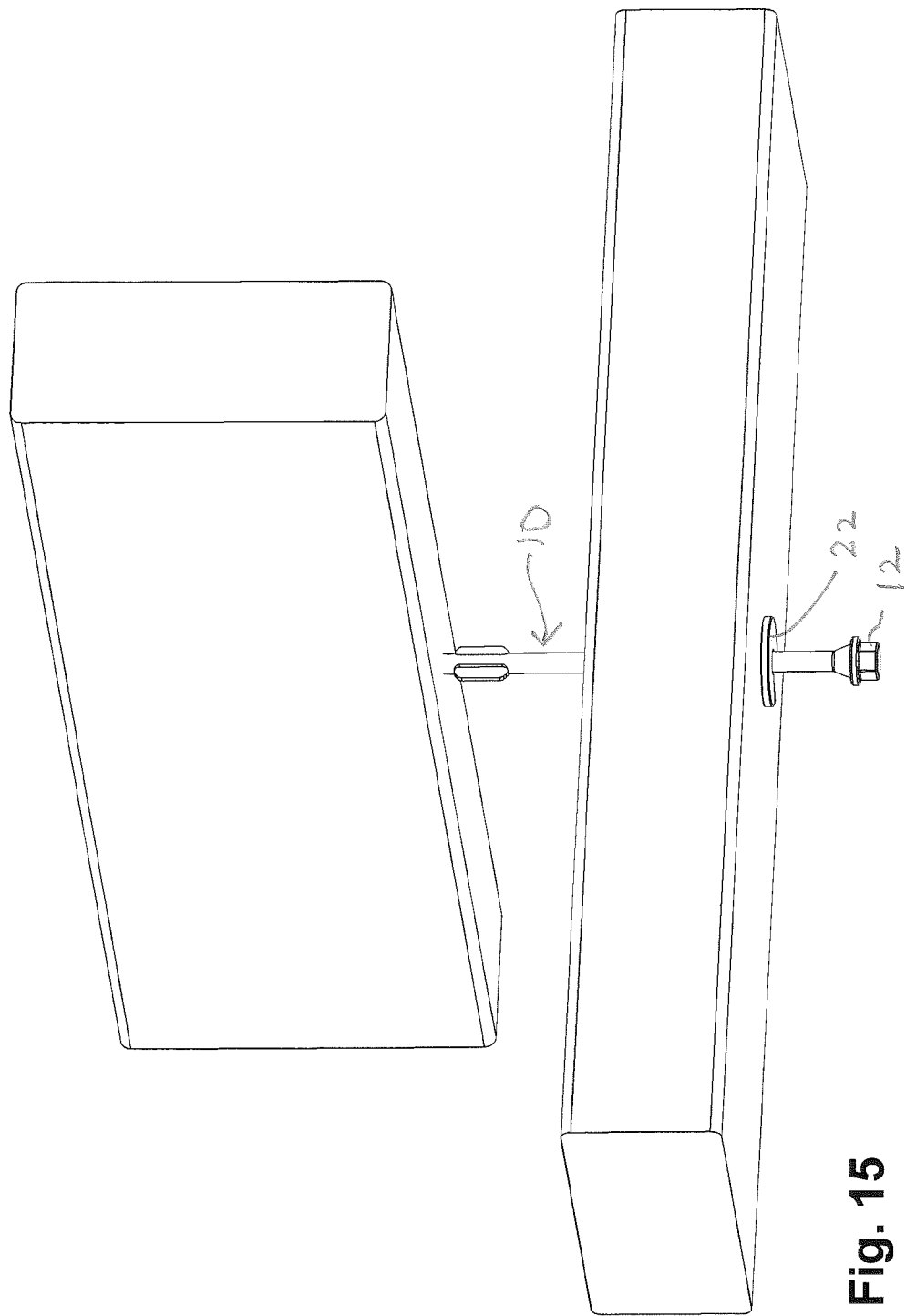
FIG. 15 is a perspective view of the floating connection of FIG. 12.
Figure 16:
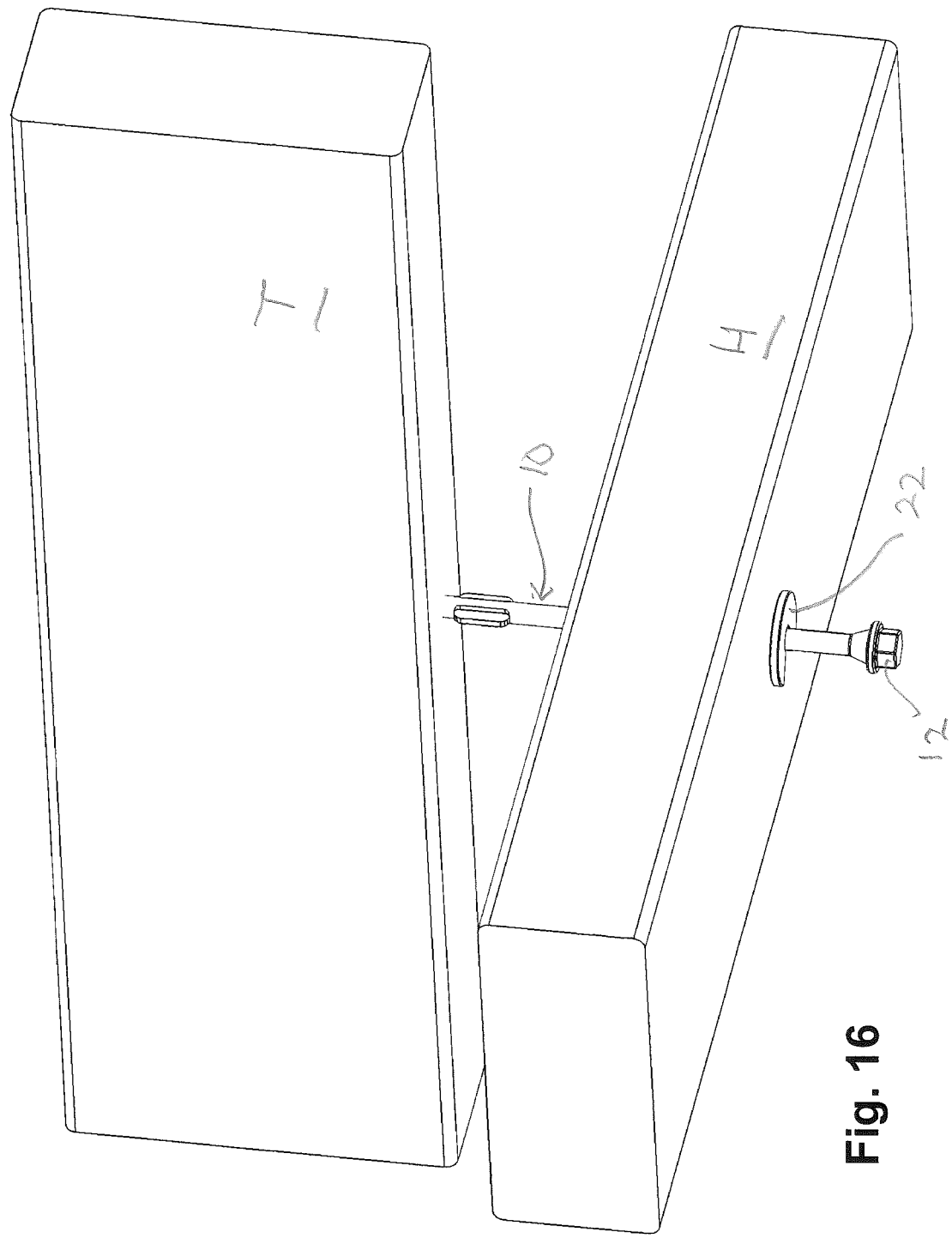
FIG. 16 is a second perspective view of the installed floating connection of FIG. 15.
Figures 17, 18:
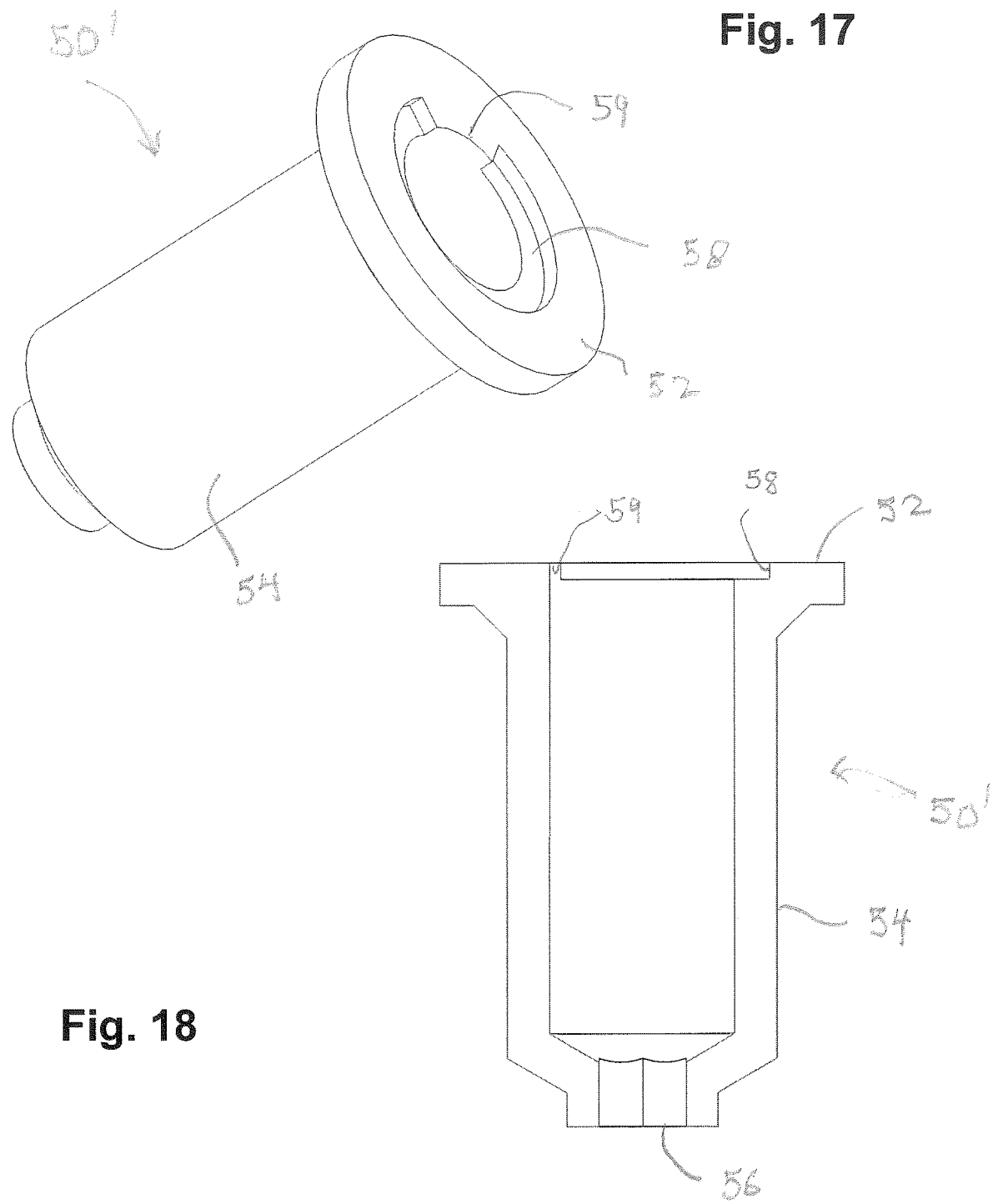
FIG. 17 is an enlarged perspective view of a second embodiment of an offset cap.
FIG. 18 is a sectional view through the offset cap of FIG. 17.

With additional reference to FIG. 9, bushing 20 is a semi-flexible plastic member having a lower quasi-annular flange 22 defining a notch 24 and a generally perpendicularly projecting semi-flexible sleeve 21. The sleeve 21 has a longitudinal slot 26 extending from the notch to the terminus of the sleeve. As shown in FIGS. 9 and 11, for example, the slot 26 defines a circumferential gap that provides a circumferential spacing 70 between a first longitudinal edge 72 and a second longitudinal edge 74 of the sleeve 21. The sleeve 21 has a cylindrical inner surface 28 interrupted by the slot 26. The sleeve 21 is configured so that it can be easily snapped over the unthreaded portion 15 of the fastener and is retained to the fastener by the flange 22 engaging the lower portion of the fastener neck/flange and the upper end 23 engaging an upper projecting portion of the reamer 16 and by the resilience of the sleeve which returns to its normal shape. The notch 24 may also facilitate capturing the fastener. Upon installation, the sleeve 21 is driven into the fastener bore of the non-load bearing member and flange 22 engages the underside surface of the non-load bearing member.

Figure 19:
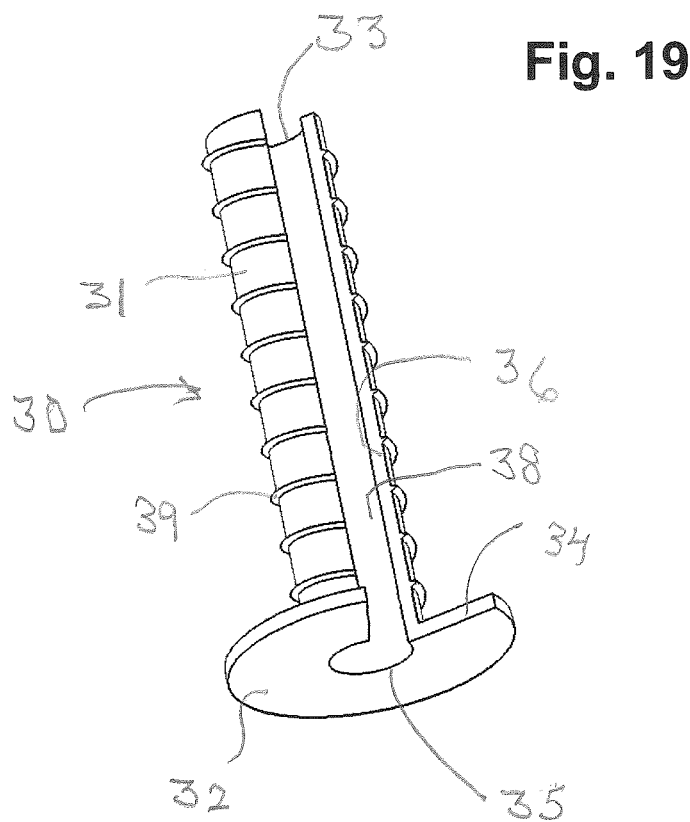
FIG. 19 is a perspective view of a second embodiment of a floating bushing.

With additional reference to FIG. 19, semi-flexible bushing 30 is similar in form and function to bushing 20 except that sleeve 31 has an exterior thread 39. Bushing 30 has a lower flange 32 with a notch 34 and sleeve 31 is traversed by a longitudinal slot 36. The inner surface 38 substantially cylindrical except for the axial slot. As shown in FIG. 19, for example, the slot 36 defines a circumferential gap that provides a circumferential spacing 70 between a first longitudinal edge 72 and a second longitudinal edge 74 of the sleeve 21. Again, bushing 30 is configured so that sleeve 31 snaps over and slides along and is rotatable about the unthreaded upper portion 15 of the fastener and is also axially slidable along with the unthreaded upper portion. Upon installation, the sleeve 31 is rotatably driven into the fastener formed bore of the non-load bearing member and flange 32 engages the underside surface of the non-load bearing member.

The offset adaptor 50 functions to receive a driver bit 60 to form an attachment assembly 65 rotatably couplable with the fastener 10 captured by the receivably mounted bushing 20 or 30. With reference to FIG. 11, upon mounting the assembly 65 to a torque driver 70 and driving the attachment assembly/fastener/bushing, a pre-established proud head position of the fastener is ultimately implemented, as illustrated in FIGS. 12-16.

With additional reference to FIGS. 5-8, the offset adaptor 50 comprises a bell-like enclosure or cap having a central axis A. The enclosure terminates at an annular reference flange 52 normal to and coaxial with the axis A. The enclosure has a quasi-cylindrical portion 54 which upwardly tapers to form a central axial opening 56. The opening 56 has a polygonal shape complementary to a shank portion of the driver bit. A coupling recess 58 coaxial with axis A is formed at the end of the adaptor. Coupling recess 58 is complementary to the flange 22 or 32 of the bushing 20 or 30.

Figure 20:
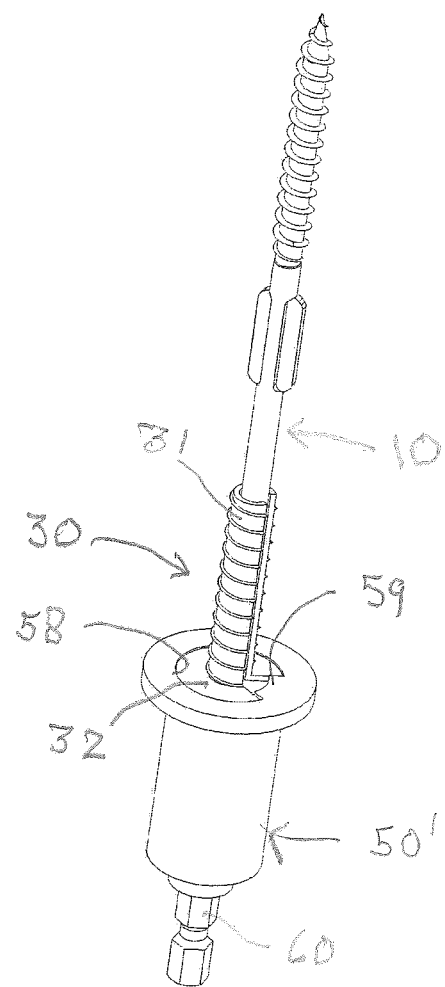
FIG. 20 is a perspective view of a floating connection assembly comprising a second embodiment of the offset cap and the floating bushing of FIG. 19.

With reference to FIGS. 19 and 20, for adaptor 50', a key 59 projects radially inwardly to interrupt the recess 58. The key 59 (FIG. 20) is generally complementary with the notch 24 or 34 of the bushing flange 22 or 32 so that upon reception of the coupled flange 22 or 32 by the adaptor 50', the adaptor 50 and bushing 20 or 30 are rotatably locked. In some embodiments wherein the sleeve has no exterior threads (such as sleeve 21), the key is omitted and there is no rotational locking between the cap or adaptor 50 and the bushing 20. Upon driving the fastener, there may be limited rotation of the bushing 20 due to friction between the flange 22 and the adaptor 50.

The driver bit 60 has a socket 62 adapted to engage the hex head 12 of the fastener. Naturally, the bit/fastener head engagement may be configured differently if the fastener torque engagement portion has a different structure. The bit has a polygonal shank portion 64 of uniform polygonal cross-section is closely received in the opening 56. The bit 60 and adaptor 50 are thus rotatably fixed. The bit shank axially projects from the adaptor and has a proximal engagement end 66. With reference to FIG. 11, the bit shank end 66 is received by the chuck 72 of a torque driver 70 which may be of numerous conventional forms.

The driver bit is retained to the housing so that it forms an interior stop with a clearance C as indicated in FIG. 8. Because of the pre-established clearance C, when the fastener is driven, the reference flange 52 ultimately engages the underside of the header H or support member, and the fastener head is torqued to drive the fastener 10 (and sleeve) so that the flange 22 or 32 carried by the cap in coupling recess 58 ultimately engages the underside of the non-load bearing member and the head essentially sits proud relative to the non-load bearing member or is offset by clearance C.

With reference to FIGS. 12-16 the bushing 20 and captured fastener 10 are installed as a unit. Upon driving and installing the fastener 10, the bushing 20 remains mounted to the fastener, and the bushing and fastener function to provide the floating connection installation between a load bearing structure, such as a truss, and a non-load bearing structure, such as a partition or interior wall. The installation is accomplished in a one-step procedure in which the fastener 10 forms a bore B in the header H or non-load bearing member as it is driven into the load bearing member such as truss T. The sleeve 21 of the bushing is forced into the bore B during the driving step via a combination of friction from the fastener and a direct pushing force from the adapter 50. The sleeve 21 is received along with the adjacent unthreaded portion of the fastener in the fastener bore B of the non-load bearing member. Upon installation, the sleeve 21 or 31 does not extend the entire axial length of the formed bore B.

The bushing 30 rotates with the driver and adaptor 50' as the fastener is driven. The exterior surface of sleeve 31 and the thread 39 frictionally engage the non-load bearing member bore B. Sleeve 31 may slightly thread or engage into the structure adjacent the non-load bearing member bore.

When installed by the embodiment of the adapter 50 (without a key like element 59 in the adapter 50'), the bushing 20, for the most part, does not rotate or only slightly rotates when the fastener is driven. Once the fastener is threaded into the load bearing member, the unthreaded portion of the fastener is slidable relative to the inner surface of the sleeve 21 or 31. The attachment assembly 65 comprising adaptor 50 and driver bit 60 is disengaged from the fastener head 12 of the implemented floating connection and is reusable with multiple captured fastener/bushings for multiple subsequent floating connection installations.

For preferred embodiments, wherein the floating bushing 20 does not have an exterior thread, it is not required that the bushing rotate with the adaptor. For such embodiments, the described key/notch configuration and engagement is not required.

While preferred embodiments of the foregoing floating connection fastening system have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A connecting system for installing a floating connection in a building assembly, comprising:
  a bushing comprising a sleeve defining a first axis and extending from a first end to a second end defining a terminal edge defining an inner diameter, the bushing having a locating flange disposed proximate said first end of the sleeve;
  a fastener having a head, a shank with an unthreaded proximal portion extending from said head and a threaded terminal portion comprising a tip and threads which are structured and arranged to penetrate and create a bore during driving of the fastener, said threaded terminal portion being capable of threadably penetrating a truss or load bearing member during installation of the fastener; and
  an adapter with a central bit for engaging a portion of the fastener head and a reference flange defining a radially outer edge, wherein
  the inner diameter defined by the terminal edge of the sleeve is interrupted by an axially extending slot into the sleeve, the sleeve is aligned on the unthreaded proximal section with the slot overlapping the unthreaded proximal section, said fastener is captured by said bushing between said head and said threaded terminal portion such that the sleeve is rotatably and axially slidable relative to the fastener along said unthreaded proximal portion, the sleeve has an outer primary surface configured to frictionally engage with a through bore via a plurality of protuberances that project outward from the outer primary surface, the reference flange is configured to abut the truss or non-load bearing member to establish a clearance for installation of the fastener, and when installed in the building assembly, the floating connection allows for movement of the fastener relative to the bushing.

2. The connecting system of claim 1, wherein the locating flange is substantially perpendicular to the first axis.

3. The connecting system of claim 1, wherein said sleeve has an exterior thread.

4. The connecting system of claim 1, wherein said fastener is configured to be driven through the non-load bearing member into the bore of the truss or load bearing member to provide a floating connection between said truss or load bearing member and said non-load bearing member wherein said bushing is received in the through bore in said non-load bearing member.

5. The connecting system of claim 4, wherein the slot in the sleeve allows flexation of the sleeve.

6. The connecting system of claim 1, wherein said shank includes an intermediate reamer with a maximum diameter that is greater than and the inner diameter of said terminal edge.

7. The connecting system of claim 1, wherein the system is engageable with an adapter with a driver bit defining a second axis and a reference flange about said first axis defining an offset clearance for installation of the system, wherein the head of the fastener is engageable with the bit in a rotationally locked relationship with the reference flange and the sleeve rotatable relative to the driver bit and reference flange.

8. The connecting system of claim 1, wherein the axially extending slot extends through the entire sleeve and through the locating flange.

9. The connecting system of claim 1, wherein the slot in the sleeve allows flexation of the sleeve.

10. The connecting system of claim 1, wherein the slot extends from the terminal edge to the first end of the sleeve and through the locating flange.

11. The connecting system of claim 1, wherein the fastener shank further includes a bore forming reamer on the unthreaded proximal portion and the bushing is positioned between the head and the bore forming reamer.

12. The connecting system of claim 1, wherein said fastener is configured to form the through bore in said non-load bearing member in situ during installation.

13. The connecting system of claim 12, wherein the sleeve is configured to be received entirely within the through bore after installation.

14. The connecting system of claim 1, further comprising an adapter having a reference flange and a bit wherein the reference flange defines a radially outer edge and a coupling recess is located radially inward of the radially outer edge, and the locating flange is received within the coupling recess when the bit is engaged with the fastener head.

15. The connecting system of claim 1, wherein said protuberances form an exterior thread.

16. The connecting system of claim 1, wherein the slot extends an entire axial length between the first end and second end of the sleeve.

17. A method for installing a floating connection comprising:

engaging an adaptor with a driver bit, the adapter having a reference flange defining an offset clearance;

capturing an elongate fastener with a bushing having a sleeve defining an axial slot and having a locating flange extending radially outward, the axial slot allowing flexation of the sleeve, the fastener having a threaded distal section toward a tip and an unthreaded proximal section toward a head, the sleeve aligned on the unthreaded proximal section with the axial slot overlapping the unthreaded proximal section;

engaging the fastener with the driver bit, thereby causing the locating flange to abut a portion of the reference flange in a rotationally independent relationship; and driving the fastener through a non-load bearing member and threadably engaging a load bearing member with the fastener so that at least a portion of the sleeve is received in a bore in the non-load bearing member.

18. The installation method of claim 17, further comprising driving the fastener through a non-load bearing member into a load bearing member so that the head is spaced from the non-load bearing member by the offset clearance.

19. The installation method of claim 18, wherein the sleeve is entirely retained in a portion of the bore of the non-load bearing member with a locating flange of the bushing outside the bore.

20. The installation method of claim 17, further comprising engaging said reference flange against a surface of the non-load bearing member to complete the step of driving.

21. The installation method of claim 17, wherein the step of driving the fastener forms the bore in the non-load bearing member in situ.

22. A connecting system for installing a floating connection in a building assembly, comprising:

a bushing comprising a sleeve defining a first axis and extending from a first end to a second end defining a terminal edge defining an inner diameter, the bushing having a locating flange disposed proximate said first end of the sleeve;

a fastener having a head, a shank with an unthreaded proximal portion extending from said head and a threaded terminal portion comprising a tip and threads which are structured and arranged to penetrate and create a bore during driving of the fastener, said threaded terminal portion being capable of threadably penetrating a truss or load bearing member during installation of the fastener, wherein the inner diameter defined by the terminal edge of the sleeve is interrupted by an axially extending slot into the sleeve, the sleeve is aligned on the unthreaded proximal section with the slot overlapping the unthreaded proximal section, said fastener is captured by said bushing between said head and said threaded terminal portion such that the sleeve is rotatably and axially slidable relative to the fastener along said unthreaded proximal portion, the sleeve has an outer primary surface configured to frictionally engage with a through bore via a plurality of protuberances that project outward from the outer primary surface, the fastener is configured to be driven through the non-load bearing member into the bore of the truss or load bearing member to provide a floating connection between said truss or load bearing member and said non-load bearing member wherein said bushing is received in the through bore in said non-load bearing member, the fastener is configured to form the through bore in said non-load bearing member in situ during installation, and when installed in the building assembly, the floating connection allows for movement of the fastener relative to the bushing.

23. The connecting system of claim 22, comprising an adapter with a central bit for engaging a portion of the fastener head and a reference flange defining a radially outer edge, wherein the reference flange is configured to abut the truss or non-load bearing member to establish a clearance for installation of the fastener.

24. The connecting system of claim 23, wherein when the bit is engaged with the fastener head, the locating flange engages a portion of the reference flange with the bushing rotationally independent of the adapter.

25. The connecting system of claim 23, wherein the adapter is configured such that when the fastener is engaged with the bit and threadedly driven into the load bearing member with the reference flange of the adapter in abutment with the truss or non-load bearing member, the sleeve is installed with at least a portion within the through bore in the non-load bearing member and the locating flange in abutment with a surface of the non-load bearing member.

26. The connecting system of claim 22, wherein the sleeve includes an axially extending slot that extends at least partially therethrough from an end opposite the locating flange.

27. The connecting system of claim 22, further comprising an adapter with a central bit for engaging a portion of the fastener head and a reference flange, wherein
the reference flange is configured to abut a non-load bearing member to establish a clearance for installation of the fastener, and
when the fastener is engaged with the bit and threadedly driven into a load bearing member with the reference flange of the adapter in abutment with a surface of the non-load bearing member, the bushing is installed with at least a portion of the sleeve within the through bore in the non-load bearing member and the locating flange in abutment with the non-load bearing member.

28. The connecting system of claim 22, wherein the protrusions comprise threads.

29. A connecting system for installing a floating connection in a building assembly, comprising:
a bushing comprising a sleeve defining a first axis and extending from a first end to a second end defining a terminal edge defining an inner diameter, the bushing having a locating flange disposed proximate said first end of the sleeve; and
a fastener having a head, a shank with an unthreaded proximal portion extending from said head and a threaded terminal portion comprising a tip and threads which are structured and arranged to penetrate and create a bore during driving of the fastener, said threaded terminal portion being capable of threadably penetrating a truss or load bearing member during installation of the fastener, wherein
the inner diameter defined by the terminal edge of the sleeve is interrupted by an axially extending slot into the sleeve,
the sleeve is aligned on the unthreaded proximal section with the slot overlapping the unthreaded proximal section,
said fastener is captured by said bushing between said head and said threaded terminal portion such that the sleeve is rotatably and axially slidable relative to the fastener along said unthreaded proximal portion,
the sleeve has an outer primary surface configured to frictionally engage with a through bore via a plurality of protuberances that project outward from the outer primary surface,
the fastener is configured to be driven through the non-load bearing member into the bore of the truss or load bearing member to provide a floating connection between said truss or load bearing member and said non-load bearing member wherein said bushing is received in the through bore in said non-load bearing member,
the axially extending slot extends through the entire sleeve and through the locating flange, and
when installed in the building assembly, the floating connection allows for movement of the fastener relative to the bushing.

* * * * *